United States Patent [19]
Astl

[11] Patent Number: 5,131,783
[45] Date of Patent: Jul. 21, 1992

[54] DOWEL CONNECTING ELEMENT

[76] Inventor: Arno Astl, Thurnbichl 42 6345, Kössen, Austria

[21] Appl. No.: 404,275

[22] Filed: Sep. 7, 1989

[30] Foreign Application Priority Data

Sep. 9, 1988 [DE] Fed. Rep. of Germany ....... 3830770
Feb. 2, 1989 [DE] Fed. Rep. of Germany ....... 3903146

[51] Int. Cl.$^5$ ............................................. F16B 13/02
[52] U.S. Cl. .................... 403/298; 403/292; 411/510
[58] Field of Search ............... 403/298, 297, 295, 296, 403/292; 411/510, 508, 509, 913, 455

[56] References Cited

U.S. PATENT DOCUMENTS

| | | | |
|---|---|---|---|
| 2,989,788 | 6/1961 | Kessler | 403/295 |
| 3,139,784 | 7/1964 | Moorman | 411/510 |
| 3,563,277 | 2/1971 | Klipper | 411/510 X |
| 3,826,053 | 7/1974 | Cameron | 403/298 X |
| 3,851,980 | 12/1974 | Worth et al. | 403/298 X |
| 3,883,258 | 5/1975 | Hewson | 403/298 |
| 3,966,339 | 6/1976 | Nemecek et al. | 403/292 |
| 4,454,699 | 6/1984 | Strobl | 403/298 X |
| 4,579,161 | 4/1986 | Roberts | 411/510 X |
| 4,681,477 | 7/1987 | Fischer | 403/292 X |
| 4,770,585 | 9/1988 | Astl | 403/282 X |
| 4,861,208 | 8/1989 | Boundry | 411/510 X |
| 4,875,641 | 10/1989 | Endo et al. | 411/510 X |

FOREIGN PATENT DOCUMENTS 3304975 5/1985 Fed. Rep. of Germany .
2067257 7/1981 United Kingdom ................ 403/298

OTHER PUBLICATIONS

German DE 3309954 A1, dated Sep. 19, 1984 of Walter Fischer (cover page).
German DE 3119041 A1, dated Dec. 19, 1982 of W. Berg et al. (cover page and drawing).
German GM 78 25 669, dated Dec. 19, 1978 Nemecek et al. (cover page and drawings).
German G 87 13 028.9, dated Mar. 19, 1988 Handelsagentur et al. (cover page and drawings).

Primary Examiner—Peter M. Cuomo
Attorney, Agent, or Firm—Austin R. Miller

[57] ABSTRACT

A connecting element for wooden or plastic parts including a rigid elongated plastic member with a modulus of elasticity from 500–15,000 having a front end, an opposite end and an outer surface. The outer surface has projections extending radially outwardly and is elastically and plastically deformable. The projections proximate the front end and have sloping flanks facing the front end and rear flanks opposing the sloping flanks and are inclined opposite the sloping flanks. Cross-sectional areas formed in the projections between corresponding rear flanks and radially extending planes formed perpendicular to a central axis extending along the member consists of at least 10% of the total cross-sectional area of the projections.

12 Claims, 2 Drawing Sheets

DOWEL CONNECTING ELEMENT

BACKGROUND OF THE INVENTION

The invention relates to a connecting element, in particular a dowel, for wooden or plastics parts, with projections arranged on the outer circumference of the connecting element.

SUMMARY OF THE INVENTION

The invention is based on the object of designing a connecting element of this type in such a way that it can be produced and used easily and, in addition, a very high retaining effect is achieved.

This object is achieved according to the invention by the following disclosed features. When knocking such a dowel into a drill hole, the radially outer regions of the projections are deformed, at first elastically and then, with increasing force effect, at least partially plastically, a supporting effect being exerted by the radially further inward material of the projections, so that an elastic effect radially outward is preserved by this supporting effect even in the case of plastic deformation of the radially outer regions. As a result, an extremely good retaining effect is produced, as tests have shown. Also, there can be compensation to a certain extent for tolerances in making the drill hole. A dowel of this type can be produced in a simple way by injection molding, compression molding or extrusion and can be used simply without glue by knocking in.

Advantageous developments of the invention are specified in the following description and in the further claims.

Illustrative embodiments of the invention are explained in more detail below with reference to the drawing, in which:

DETAILED DESCRIPTION OF THE PREFERRED EMBODIMENTS

Figure 1:
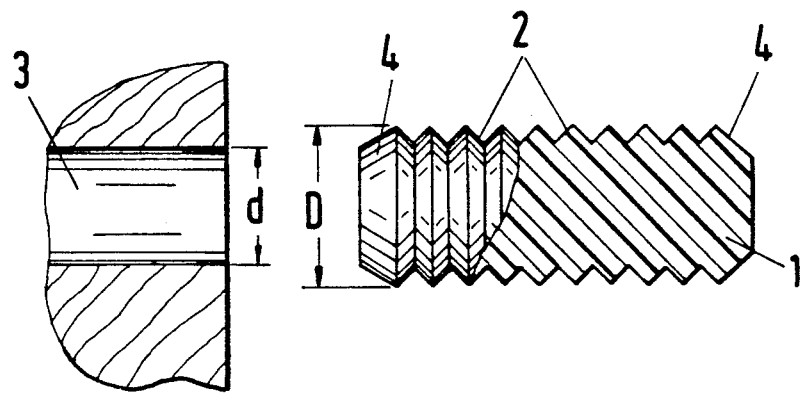
FIG. 1 shows, in a longitudinal section, a dowel with projections of the same shape, symmetrical in both knocking-in directions.

A cylindrical dowel 1 of plastics material, on the outer circumference of which annular or helical projections 2 are formed over the length of the dowel, is reproduced in FIG. 1. These projections have in cross section a cross-sectional shape which is symmetrical in the knocking-in direction of the dowel similar to an equilateral triangle, i.e. the flanks of the projections have the same angle of inclination in both directions, so that the dowel 1 can be knocked into a drill hole 3 both in the one direction and in the other direction, irrespective of the depth of penetration. The outside diameter D of the dowel with projections 2 is somewhat greater than the diameter d of the drill hole 3 in the assigned wooden or plastics part. The oversize of the dowel in relation to the drill hole is less than 2 mm, preferably less than 1 mm and lies in particular between 0.2 and 0.6 mm. The ends of the dowel 1 are preferably beveled frustoconically at 4, in order to facilitate the insertion into the drill hole 3.

The dowel 1 is produced integrally by compression molding, injection molding or the like from a plastics material which lends the dowel a high rigidity in the knocking-in direction, the outer regions of the projections 2 being deformable however, at first elastically and, with increasing force effect, plastically.

The material of the dowel has a modulus of elasticity of 500 to 15,000 $N/mm^2$, preferably from 1,000 to 10,000 and, in particular, from 1,500 to 5,000 $N/mm^2$. The expansion up to flowing or up to plastic deformation is less than 20%, preferably less than 10% and, in particular, about 3 to 8%. In this range, an elastic deformation takes place, beyond it a plastic deformation. Thermoplastics of which the elasticity is below 10%, a change in shape exceeding 10% entailing a plastic deformation over a relatively large range of expansion, for example up to 120% expansion, are preferably used for the production of the dowel. For example, a polycarbonate having an elasticity or expansion up to flowing of 6 to 7%, a range of plastic deformation up to about 80 to 120% expansion and a modulus of elasticity of approximately 2,300 $N/mm^2$ can be used. The tensile strength of such a material is around 60 $N/mm^2$.

Figure 2:
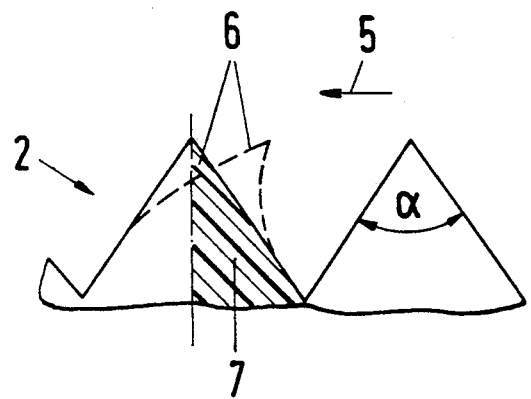
FIG. 2 shows, in an enlarged representation, one of the projections in cross section.

FIG. 2 shows in cross section an individual projection 2 in the shape of an equilaterial triangle, the knocking-in direction being indicated by an arrow 5. In the radially outer region at 6, the projection 2 can be easily deformed elastically due to the lesser material thickness and, with increased forced effect, plastically, as indicated by broken lines, the broader base region forming an elastic support.

The rear cross-sectional region 7, shown shaded in FIG. 2 and bounded by the perpendicular from the radially outer point of the projection to the axis and its rear flank, contributes in particular to the support, it being possible to influence the supporting effect by increasing or reducing this area 7. The area 7 shaded in FIG. 2 should be over 20%, preferably over 30%, but at least 10% of the cross-sectional area of the projection 2. Even if the outer region 6 is already plastically deformed as represented by broken lines, the lower region of the shaded area 7 still forms an elastic support, by means of which the outer region 6 can still spring back even under plastic deformation.

The angle $a$, indicated in FIG. 2, between the two flanks at the tip and at the radially outer region 6 of a projection 2 is greater than 60°, preferably greater than 70° and, in particular, greater than 80°, in particular in the case of an annular or helical configuration of the projections 2. The spacing between the tips of the individual projections 2 in the axial direction of the dowel is approximately 1.5 to 0.5 mm. In the case of one practical exemplary embodiment, about 20 projections 2 are arranged on a dowel length of 20 mm.

Figure 3:
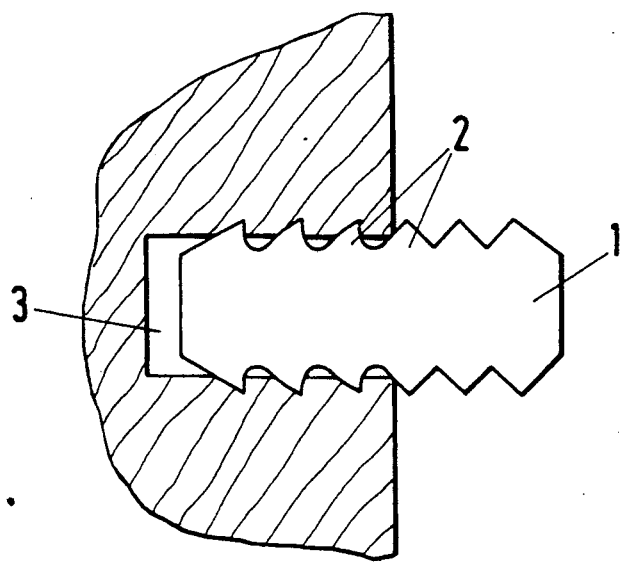
FIG. 3 shows, in a longitudinal section, a dowel knocked into a drill hole at one end.

FIG. 3 shows a dowel knocked into a drill hole with correspondingly deformed projections 2. Tests have shown that, when knocking the dowel into the drill hole of a chipboard or wooden part, the wood material essentially fills the clearances between the individual projections 2 completely and the projections 2 engage in the wood material in a barb-like manner, as FIG. 3 shows diagrammatically.

Figure 4:
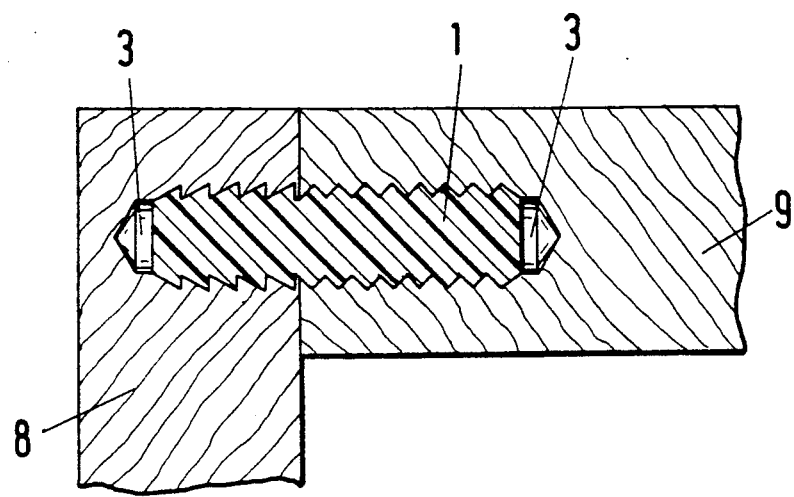
FIG. 4 shows, in a longitudinal section, a dowel in the knocked-in state for the connection of two chipboards.

FIG. 4 shows a dowel knocked into two chipboards lying perpendicularly to each other. In the case of such chipboards, as are used in the furniture industry, the denser and harder outer layers of the one chipboard 8 lie transversely to the drill hole 3 and to the knocking-in direction of the dowel, while the drill hole in the case of the chipboard 9 is made in the more compliant, softer region in the middle of the end face. When connecting the two chip boards 8, 9, the dowel 1 is advantageously knocked or driven first into the harder wooden part 8, the front projections 2 being deformed more by the hard material than the following projections, as is indicated in FIG. 4. Since the wood material has a certain inherent elasticity, it springs back after the knocking-in of the dowel and penetrates the intermediate spaces between the projections 2, so that a good retaining effect is obtained. During knocking-in, the projections are deformed oppositely to the withdrawal direction, so that they form barbs. Thereafter, the part of the dowel protruding from the wooden part 8 is pressed or knocked into the softer wooden part 9, the projections 2 not being deformed as much, due to the more compliant material. In this case as well, the wood material springs back, so that it engages between the projections 2. When knocking the dowel into the wooden part 9, a lesser force is necessary than when knocking into the harder wooden part 8. In order to obtain a joint-tight connection between the two wooden parts 8, 9, the wooden parts are extra-compressed in order to utilize the elasticity of the wood. This avoids the initially tight joint being able to open again by slight springing back of the dowel after knocking-in.

While the dowel according to FIGS. 1 and 4 has a solid cross section, a hollow cross section of the dowel is also possible. For example, a dowel with solid cross section in the middle region and hollow spaces widening outward may be provided. This achieves the effect of a certain elasticity in the radial direction on the thinner-walled end sections of the dowel, which leads at first to a slight contraction when the dowel is knocked into a drill hole and to a radial springing back after knocking-in. This can also be accomplished by longitudinal slits on a continuously hollow dowel.

Instead of the annular or helical projections 2, projections extending partially over the circumference or individual projections distributed over the circumference may also be provided, for example in cone shape, pyramid shape or the like, it being possible for such individual projections to be distributed unevenly over the circumference or else to be arranged in rows.

The height of the projections 2 is expediently less than 2 mm, preferably less than 1 mm and lies, in particular, between 0.2 and 0.6 mm in the case of a dowel diameter of about 1 cm.

Figure 5:
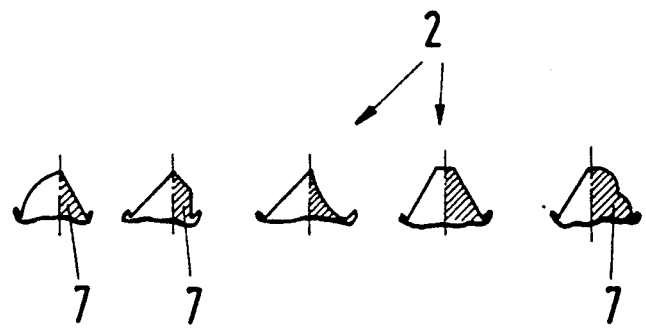
FIG. 5 shows various embodiments of the cross-sectional shape of the projections.

FIG. 5 shows various exemplary cross-sectional shapes of projections 2, the section 7 of importance for the supporting effect being indicated by shading in each case. The flanks of the projections 2 may be convexly or concavely curved and the radially outer end region 6 may also be flattened off or rounded off.

Differently shaped projections may also be provided over the dowel length, for example projections with a smaller supporting region, that is a steeper flank than the front flank in the knocking-in direction, on the end sections, while projections 2 with a cross-sectional shape similar to an equilateral triangle, which are more rigid due to the greater supporting area, are provided in the middle region of the dowel. In this case, the projections may have the same height over the length of the dowel. It is also possible, however, to provide projections standing out radially further toward the middle.

The projections 2 may be expediently formed by theaded sections, one threaded section extending on one half of the circumference of the dowel and the other threaded section on the other half of the circumference, offset and/or running counter to the first, so that there is an essentially uniform area of engagement on the dowel ends.

In the longitudinal direction of the dowel, radially protruding ribs may be provided on the outer circumference for the guidance of the dowel. Similarly, grooves may be formed in the longitudinal direction on the circumference of the dowel, so that a material flow is possible at the location of these grooves. At the same time, air can escape through such grooves during the knocking-in of the dowel, in order that a compression of the air in the drill hole during knocking-in of the dowel is avoided.

According to another configuration, the core diameter of a cylindrical dowel may be designed as lessening from the middle in the direction of the two ends, while the outside diameter D of the dowel remains constant over the length, so that shorter, and thus more rigid, projections are provided in the middle region of the dowel than in the region of the end sections of the dowel. In this case as well, the dowel may have a solid cross section over the length or be provided with hollow spaces or incisions running in the longitudinal direction.

It is also possible to injection-mold plastic around a metal core for the formation of the dowel. This allows the dowel to be of a rigid design in the knocking-in direction, while the plastics material molded around the metal core allows an at least partially plastic deformation at the projections.

The dowel may have a section with larger diameter and a section with smaller diameter, in order that there is a step when the section with smaller diameter is knocked in. To form a dowel to be used as a fastening element only at one end, a flange or some other part may be fitted on the dowel end and serves at the same time as a stop when knocking the dowel into the drill hole. Such a part fitted on the dowel end may be a fitting such as is used in the furniture industry.

In the establishment of a corner connection between two chipboards 8, 9 according to FIG. 3, a stop or a spacer is expediently placed against the drill hole during knocking-in of the dowel into the flat side of the chipboard 8 and the dowel is knocked into the drill hole as far as the height of this stop, whereupon the remaining section of the dowel can be knocked into the end face of the chipboard 9.

It is also possible to glue the dowel at first into a drill hole in the softer end face of the chipboard 9 and, once the glue has hardened, to knock the dowel into a drill hole in the more solid surface of the chipboard 8, without adding glue. In such a case, recesses or grooves, which serve to receive excess glue, are expediently provided on the front end of the dowel.

Instead of a cylindrical dowel, a connecting element which is, for example, angled-off or flat in the form of a plate, or else shaped in some other way, may also be provided, projections of the described type being formed on a certain region of the outer surface. The connecting element described is intended in particular for chipboards and other wooden parts, but it is also possible to connect plastics parts or the like to one another.

I claim:

1. A connecting element for wooden or plastic parts comprising a rigid elongated plastic member with a modulus of elasticity from 500 to 15,000 and having a front end, an opposite end and an outer surface, said outer surface having integral projections extending outwardly at said front and opposite ends and being elastically and plastically deformable, wherein said projections having sloping flanks facing said front and opposite ends, respectively, and rear flanks opposing said respective sloping flanks and being inclined opposite said sloping flanks, wherein an angle formed between associate pairs of said sloping flanks and said rear flanks being greater than 60° and wherein a cross-sectional area of said projections between corresponding ones of said rear flanks and associate radially extending planes extending perpendicular to a central axis extending along said member comprise at least 10% of total cross-sectional area between said associate pairs of said sloping and rear flanks of said projections.

2. The connecting element as claimed in claim 1, wherein the projections have the cross-sectional shape of an equilateral triangle.

3. The connecting element as claimed in, claim 1, wherein the connecting element consists of a plastic material with a modulus of elasticity from 1,000 to 5,000 N/mm².

4. The connecting element as claimed in claim 1, wherein the member is elastically deformable in the case of expansion of less than 20% and plastically deformable in the case of greater expansion.

5. The connecting element as claimed in claim 1 wherein hollow spaces are formed transversely to said central axis at least over a part of a linear dimension of the connecting element.

6. The connecting element as claimed in claim 1 wherein the connecting element consists of a plastic material with a modulus of elasticity from 1,500–3,000 N/mm².

7. The connecting element as claimed in claim 1 wherein the member is elastically deformable in the case of expansion of less than 10% and plastically deformable in the case of greater expansion.

8. A method of connecting boards adjacent each other by a connecting element wherein the connecting element comprises a rigid elongated plastic member having a modulus of elasticity from 500–15,000 and having a front end portion, an opposite end portion and an outer surface, said outer surface having integral projections extending outwardly from an axis extending along the front and opposite end portions of the member and being elastically and plastically deformable, wherein said projections having sloping flanks facing said front and opposite end portions, respectively, and rear flanks opposing said respective sloping flanks and being inclined opposite said sloping flanks, wherein an angle formed between associate pairs of said sloping flanks and said rear flanks being greater than 60° and wherein a cross-sectional area of said projections between corresponding ones of said rear flanks and associate radially extending planes extending perpendicular to a central axis extending along said member comprise at least 10% of a cross-sectional area between said associate pairs of sloping and rear flanks of said projections, comprising the steps of first knocking the front end portion of said connecting element into a drill hole on a side of a board transversely to the grain of said board, and then knocking the opposite end portion of the connecting element into a drill hole in an end face of another board.

9. A connecting element for wooden or plastic parts comprising a rigid elongated plastic member with a modulus of elasticity from 500 to 15,000 having a front end, an opposite end and an outer surface, said outer surface having integral projections extending outwardly at said front and opposite ends and being elastically and plastically deformable, wherein said projections having sloping flanks facing said front and opposite ends, respectively, and rear flanks opposing said respective sloping flanks and being inclined opposite said sloping flanks, wherein an angle formed between associate pairs of said sloping flanks and rear flanks being greater than 60° and wherein a cross-sectional area of said projections between corresponding ones of said rear flanks and associate radially extending planes extending perpendicular to a central axis extending along said member comprise at least between 10% and 30% of a total cross-sectional area between said associate pairs of said sloping and rear flanks of said projections.

10. A method of connecting boards adjacent each other by a connecting element wherein the connecting element comprises a rigid elongated plastic member having a front portion with a front end adapted for insertion into a drill hole in one of said boards, an opposite portion with an opposite end adapted for insertion into a drill hole in another of said boards and an outer surface, said outer surface having integral projections extending outwardly at the front and opposite portions from an axis extending along the member and being elastically and plastically deformable, wherein said projections on said front and opposite portions having sloping flanks facing said front and opposite ends, respectively, and rear flanks opposing said sloping flanks and being inclined opposite said sloping flanks, wherein an angle formed between associate pairs of said sloping flanks and said rear flanks being greater than 60°, wherein a cross-sectional area of said projections between corresponding ones of said rear flanks and associate radially extending planes extending perpendicular to a central axis extending along said member comprise at least 10% of a total cross-sectional area between said associate pairs of said sloping and rear flanks of said projections, comprising the steps of first knocking the front end of said connecting element into drill hole on a side of a board transversely to the grain of said board, and then knocking the opposite end of the connecting element into a drill hole in an end face of another board.

11. A connecting element for wooden or plastic parts comprising a rigid elongated plastic member having a front end, an opposite end and an outer surface, said outer surface having integral projections extending outwardly at said front and opposite ends from a central axis extending along the member and being elastically and plastically deformable, wherein said projections having sloping flanks facing said front and opposite ends, respectively, and rear flanks opposing said respective sloping flanks, and being inclined opposite said sloping flanks, wherein an angle formed between associate pairs of said sloping flanks and said rear flanks being greater than 60° and wherein a cross-sectional area of said projections between corresponding ones of said rear flanks and associate radially extending planes extending perpendicular to said central axis extending along the plastic member comprise at least 10% of a total cross-sectional area between said associate pairs of said sloping and rear flanks of the projection.

12. The element defined in claim 11 wherein the plastic member has a modulus of elasticity from 500 to 15,000.

* * * * *